Sept. 13, 1932. J. BERGE 1,876,835

SPRING WASHER

Filed Aug. 12, 1931

Inventor
Joseph Berge
by
Attorney

Patented Sept. 13, 1932

1,876,835

UNITED STATES PATENT OFFICE

JOSEPH BERGE, OF MONTCLAIR, NEW JERSEY, ASSIGNOR TO NATIONAL LOCK WASHER COMPANY, OF NEWARK, NEW JERSEY, A CORPORATION OF NEW JERSEY

SPRING WASHER

Application filed August 12, 1931. Serial No. 556,677.

My invention relates to spring washers either of the helical or spiral type and has for its object to provide a washer that may be located within a countersunk opening, and to that end is of a general conical shape, the outer edge adapting itself to said opening, while the inner edge affords a countersunk portion within which the conical shaped head of a screw or bolt, passed through the washer into the part to be secured, may fit so that both the outer face of the washer and said head will be flush with said part.

In the accompanying drawing.

Similar numerals of reference denote like parts in the several figures of the drawing.

Figure 1:
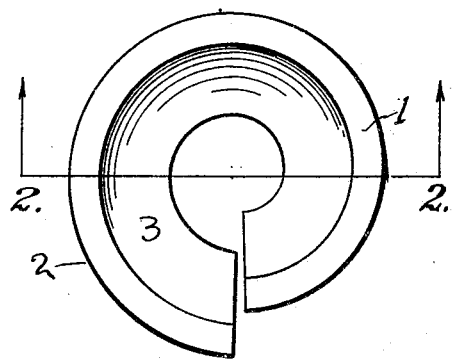
Figure 1 is a top view of a plain spiral washer made in accordance with my invention—
Figure 2:
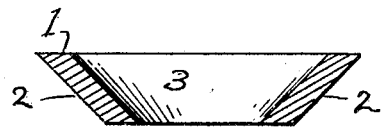
Figure 2 is a section at the line 2—2 of Figure 1—

Referring to Figures 1 and 2, 1 is a plain spiral washer whose outer edge 2 is inclined inwardly and whose inner edge 3 is also inwardly inclined so as to provide a countersink for the purpose hereinafter to be explained.

Figure 3:
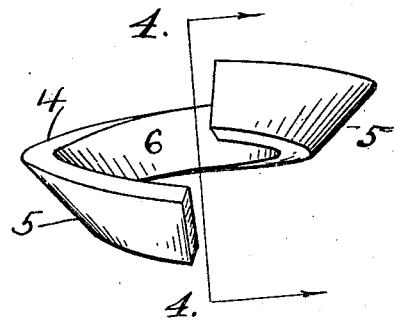
Figure 3 is an elevation of a helical shaped washer embodying my invention—
Figure 4:
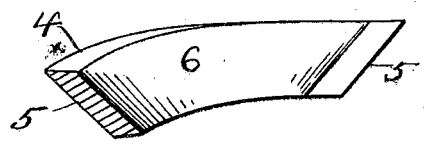
Figure 4 is a section at the line 4—4 of Figure 3.

Referring to Figures 3 and 4, the outer edge of the washer 4 is denoted by the numeral 5 and is inclined inwardly, and the inner edge 6 is similarly inclined for the purpose now to be explained.

7 is any part, object or material that is to be secured to any other structure, and this part 7 has a countersunk opening 8 therein.

It is immaterial whether the washer shown at Figure 1 or at Figure 3 is used, since in either instance the washer is placed within the opening 8 and the bolt or screw 9 passed through the washer, the part 7 and the structure to which said part is to be secured, the head 10 of said bolt or screw being of a general conical shape to correspond with the inclined inner edge of the washer as well as the countersink 8.

If a screw is employed, its inner end would be threaded and would be driven into said structure to thereby force the washer against the walls of the opening 8, and the resiliency of the washer would cause it to bind against the head of the screw and prevent the latter from becoming loose, and if a bolt is used it would pass through the part 7 and said structure and a nut would be driven on the threaded end of the bolt to bring about the same result as in the instance of the screw above set forth.

Figure 5:
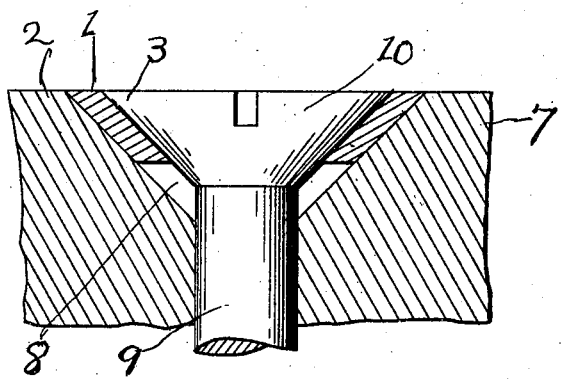
Figure 5 is a sectional elevation showing my invention applied for use.

It will therefore be clear that it is immaterial whether the washer be spiral or helical, so long as its outer and inner edges are inclined to correspond to the incline of the countersunk portion 8, and although at Figure 5, I have indicated a spiral washer, nevertheless, the showing of a helical washer would be identical.

What is claimed is:—

A spring washer adapted for an inclined countersunk opening in a part to be secured to another structure, said washer being split and of helical or spiral form and having its outer and inner edges inclined in parallelism, said washer adapted to be used in connection with a bolt or screw having an inclined head, said bolt or screw adapted to be passed through said washer and part and tightened to said structure whereby the inclined head of said bolt or screw will be forced against the inclined edges of the washer and will thereby compress the latter and expand the outer inclined edges of the washer against the wall of said opening.

In testimony whereof I affix my signature hereto.

JOSEPH BERGE.